US008965434B2

(12) United States Patent
Suh et al.

(10) Patent No.: US 8,965,434 B2
(45) Date of Patent: Feb. 24, 2015

(54) METHOD AND APPARATUS FOR APERIODICALLY TRANSMITTING AND RECEIVING A SOUNDING REFERENCE SIGNAL

(75) Inventors: Sungjin Suh, Seoul (KR); Kibum Kwon, Seoul (KR); Sungkwon Hong, Seoul (KR)

(73) Assignee: Pantech Co., Ltd., Seoul (KR)

( * ) Notice: Subject to any disclaimer, the term of this patent is extended or adjusted under 35 U.S.C. 154(b) by 276 days.

(21) Appl. No.: 13/696,237

(22) PCT Filed: May 3, 2011

(86) PCT No.: PCT/KR2011/003321
§ 371 (c)(1),
(2), (4) Date: Nov. 5, 2012

(87) PCT Pub. No.: WO2011/139082
PCT Pub. Date: Nov. 10, 2011

(65) Prior Publication Data
US 2013/0053083 A1 Feb. 28, 2013

(30) Foreign Application Priority Data

May 3, 2010 (KR) .................. 10-2010-0041595
May 4, 2010 (KR) .................. 10-2010-0041827

(51) Int. Cl.
| H04B 7/00 | (2006.01) |
| H04B 15/00 | (2006.01) |
| H04W 72/00 | (2009.01) |
| H04L 5/00 | (2006.01) |
| H04W 72/12 | (2009.01) |
| H04L 25/02 | (2006.01) |

(52) U.S. Cl.
CPC ............ *H04L 5/0007* (2013.01); *H04L 5/0048* (2013.01); *H04W 72/12* (2013.01); *H04L 25/0226* (2013.01)
USPC ......... 455/509; 455/507; 455/501; 455/452.1

(58) Field of Classification Search
CPC .................................................. H04L 5/0053
USPC .................. 455/509, 507, 501, 500
See application file for complete search history.

(56) References Cited

U.S. PATENT DOCUMENTS

| 2010/0002647 A1 | 1/2010 | Ahn et al. |
| 2010/0040005 A1 | 2/2010 | Kim et al. |
| 2011/0199944 A1* | 8/2011 | Chen et al. .................. 370/280 |

FOREIGN PATENT DOCUMENTS

| KR | 10-2008-0085653 | 9/2008 |
| KR | 10-2008-0088525 | 10/2008 |
| KR | 10-2008-0093319 | 10/2008 |
| KR | 10-2010-0020411 | 2/2010 |

OTHER PUBLICATIONS

International Search Report dated Dec. 23, 2011 issued for PCT/KR2011/003321.

* cited by examiner

*Primary Examiner* — Tilahun B Gesesse
(74) *Attorney, Agent, or Firm* — H.C. Park & Associates, PLC

(57) ABSTRACT

A method for aperiodically receiving a sounding reference signal, comprises: determining a first range of an aperiodic sound signal of a first user equipment (UE), a second range which overlaps with the first range and allows a second UE to transmit a demodulation reference signal, data or a periodic sounding reference signal, and a third range which overlaps with the first range and allows a third UE to transmit a demodulation reference signal; generating a first instruction to the first UE to transmit an aperiodic sounding reference signal in the first range; generating a second instruction to the second UE to puncture or hold a signal containing data or a periodic sounding reference signal, if either signal is transmitted in the second range; transmitting the first instruction to the first UE, and the second instruction to the second UE; and receiving the aperiodic sounding reference signal from the first UE.

16 Claims, 16 Drawing Sheets

METHOD AND APPARATUS FOR APERIODICALLY TRANSMITTING AND RECEIVING A SOUNDING REFERENCE SIGNAL

CROSS-REFERENCE TO RELATED APPLICATIONS

This application is the National Stage Entry of International Application No. PCT/KR2011/003321, filed on May 3, 2011 and claims priority from and the benefit of Korean Patent Application Nos. 10-2010-0041595, filed on May 3, 2010, and 10-2010-0041827, filed on May 4, 2010, all of which are hereby incorporated by reference for all purposes as if fully set forth herein.

BACKGROUND

1. Field

The present invention relates to a wireless communication system, and more particularly to a method and an apparatus for aperiodically transmitting and receiving a control signal for estimating a channel state of a resource in a wireless communication system.

2. Discussion of the Background

With the progress of communication systems, consumers such as companies and individuals have used a wide variety of wireless terminals.

In current wireless communication systems such as a 3GPP LTE (3$^{rd}$ Generation Partnership Project Long Term Evolution) and a 3GPP LTE-A (LTE Advanced), as a high-speed and high-capacity communication system capable of transmitting and receiving various data such as images and wireless data beyond voice-oriented services, it is required to develop a technology capable of transmitting a large amount of data coming close to that of a wired communication network. In addition, an appropriate error correction and detection scheme in which system performance can be improved by minimizing information loss and increasing system transmission efficiency, becomes an essential element.

Also, in current wireless communication systems, various control signals are used to provide information on a communication environment and the like to a counterpart apparatus in uplink or downlink. As an example of control signals, a reference signal is being discussed.

For example, in an LTE (Long Term Evolution) system, during uplink transmission, a user equipment (UE) transmits a sounding reference signal corresponding to a channel estimation reference signal indicating a channel state, to a base station. Meanwhile, during downlink transmission, in order to detect channel information, the base station transmits a Cell-specific Reference Signal (CRS) corresponding to a reference signal to the UE in each subframe.

Also, recently, due to the flexibility and the like of a communication system, a discussion intended to aperiodically transmit a channel estimation reference signal and the like is in progress. However, a current state is that a specific scheme and the like related to this discussion have not been determined. In view of these conditions, there is a need for a specific method for transmitting an aperiodic channel estimation reference signal.

SUMMARY

Therefore, an aspect of the present invention is to provide an apparatus and a method for transmitting and receiving a control signal for estimating a channel state of a user equipment in a wireless communication system.

Also, an aspect of the present invention is to provide an apparatus and a method for aperiodically transmitting and receiving a sounding reference signal for estimating a channel state of a user equipment in a wireless communication system.

Also, an aspect of the present invention is to provide an apparatus and a method for transmission and reception, which minimize a collision of a sounding reference signal with another reference signal in an entire bandwidth when the entire bandwidth is used to aperiodically transmit the sounding reference signal in a wireless communication system.

Also, an aspect of the present invention is to provide an apparatus and a method for transmission and reception, which in a wireless communication system, can aperiodically transmit a sounding reference signal in an entire bandwidth, and can transmit a signal in an unused bandwidth in order to enable a reduction in a transmission time period, or can overlap signals and can transmit the overlapped signals in a used bandwidth.

Also, an aspect of the present invention is to provide a technology for transmitting and receiving an aperiodic sounding reference signal, which minimizes a collision of the aperiodic sounding reference signal with another reference signal in a wireless communication system.

Further, an aspect of the present invention is to provide an apparatus and a method in a communication system, which perform signaling for information which instructs that a sounding reference signal is transmit in such a manner as to minimize a collision of the sounding reference signal with another reference signal.

In order to achieve the above objects, in accordance with an aspect of the present invention, there is provided a method for aperiodically receiving a sounding reference signal, which includes: determining, by a base station, a first transmission region in which a first user equipment transmits an aperiodic sounding signal, a second transmission region which overlaps the first transmission region, and in which a second user equipment transmits a demodulation reference signal, or transmits data, or transmits a periodic sounding reference signal, and a third transmission region which overlaps the first transmission region, and in which a third user equipment transmits a demodulation reference signal; generating, by the base station, first instruction information which instructs the first user equipment to transmit an aperiodic sounding reference signal in the first transmission region; generating, by the base station, second instruction information which instructs the second user equipment to puncture or hold a signal when the second user equipment transmits the signal including data or the periodic sounding reference signal in the second transmission region; transmitting, by the base station, the first instruction information to the first user equipment, and transmitting, by the base station, the second instruction information to the second user equipment; and receiving, by the base station, the aperiodic sounding reference signal from the first user equipment in the first transmission region.

In accordance with another aspect of the present invention, there is provided a method for aperiodically transmitting a sounding reference signal, which includes: receiving, by a user equipment, instruction information from a base station; and transmitting, by the user equipment, an aperiodic sounding reference signal in a predetermined frequency band and during a predetermined time period when the instruction information is first instruction information which instructs transmitting the aperiodic sounding reference signal in the predetermined frequency band and during the predetermined time period, and puncturing or holding, by the user equipment, a signal when the instruction information is second instruction information which instructs puncturing or holding the signal including data or the periodic sounding reference signal.

In accordance with still another aspect of the present invention, there is provided an apparatus for aperiodically receiving a sounding reference signal, which includes: a determiner of a base station for determining a first transmission region in which a first user equipment transmits an aperiodic sounding signal, a second transmission region which overlaps the first transmission region, and in which a second user equipment transmits a demodulation reference signal, or transmits data, or transmits a periodic sounding reference signal, and a third transmission region which overlaps the first transmission region, and in which a third user equipment transmits a demodulation reference signal; an instruction information generator of the base station for generating first instruction information which instructs the first user equipment to transmit an aperiodic sounding reference signal in the first transmission region, and generating second instruction information which instructs the second user equipment to puncture or hold a signal when the second user equipment transmits the signal including data or the periodic sounding reference signal in the second transmission region; and a transmitter/receiver of the base station for transmitting the first instruction information to the first user equipment, transmitting the second instruction information to the second user equipment, and receiving the aperiodic sounding reference signal from the first user equipment in the first transmission region.

In accordance with yet another aspect of the present invention, there is provided an apparatus for aperiodically transmitting a sounding reference signal, which includes: a transmitter/receiver of a user equipment for receiving a wireless signal from a base station; an instruction information extractor of the user equipment for extracting, from the received wireless signal, first instruction information which instructs transmitting an aperiodic sounding reference signal in a predetermined frequency band and during a predetermined time period, or second instruction information which instructs puncturing or holding a signal including data or a periodic sounding reference signal; and an aperiodic sounding signal generator of the user equipment for generating the aperiodic sounding reference signal to be transmitted in the frequency band and during the time period when instruction information extracted by the instruction information extractor is the first instruction information, wherein the transmitter/receiver transmits the generated aperiodic sounding reference signal when the instruction information is the first instruction information, and the transmitter/receiver punctures or holds the signal including the data or the periodic sounding reference signal when the instruction information is the second instruction information.

DETAILED DESCRIPTION OF THE ILLUSTRATED EMBODIMENTS

Figure 1:
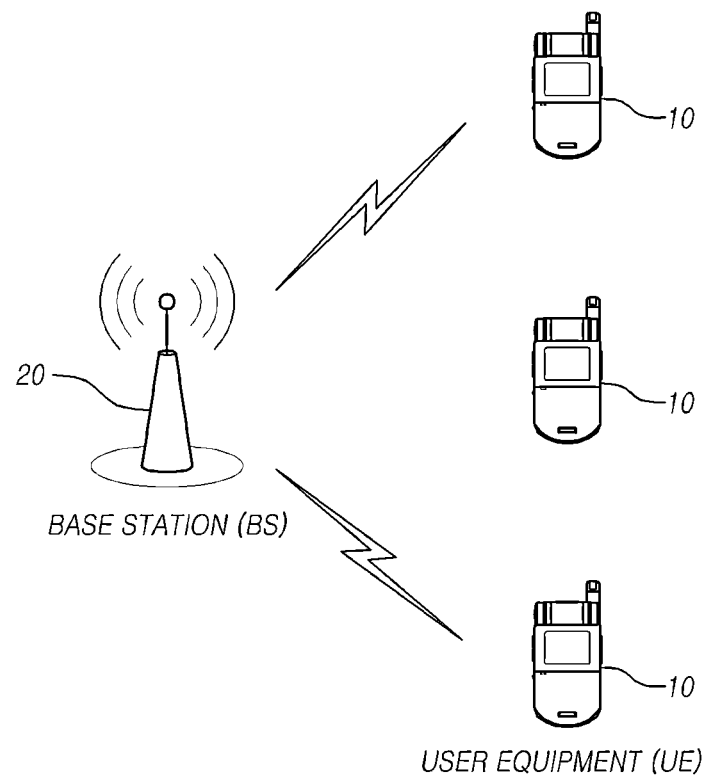
FIG. 1 is a view showing a wireless communication system, to which exemplary embodiments of the present invention are applied.

Hereinafter, exemplary embodiments of the present invention will be described in detail with reference to the accompanying drawings. It should be noted that in assigning reference numerals to elements in the drawings, the same elements will be designated by the same reference numerals although they are shown in different drawings. Also, in describing the present invention, a detailed description of publicly-known functions or configurations related to the present invention will be omitted when it is determined that the detailed description thereof may unnecessarily obscure the subject matter of the present invention.

FIG. 1 is a view showing a wireless communication system, to which exemplary embodiments of the present invention are applied.

Referring to FIG. 1, a User Equipment (UE) 10 has a comprehensive concept implying a user terminal in wireless communication. Accordingly, the UEs should be interpreted as having the concept of including a MS (Mobile Station), a UT (User Terminal), an SS (Subscriber Station), a wireless device, and the like in GSM (Global System for Mobile Communications) as well as UEs (User Equipments) in WCDMA (Wideband Code Division Multiple Access), LTE (Long Term Evolution), HSPA (High Speed Packet Access), etc. Hereinafter, a user equipment will be referred to as a "UE."

A Base Station (BS) 20 usually refers to a station communicating with the UE 10, and may be called different terms, such as a Node-B, an eNB (evolved Node-B), a BTS (Base Transceiver System), an AP (Access Point), and a relay node. A cell has a meaning including various coverage areas such as a mega cell, a macro cell, a micro cell, a pico cell, a femto cell, and a relay node communication range.

A wireless communication system may employ various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, and OFDM-CDMA. In this respect, use may be made of a TDD (Time Division Duplex) scheme in which uplink transmission and downlink transmission are performed at different times. Otherwise, use may be made of an FDD (Frequency Division Duplex) scheme in which uplink transmission and downlink transmission are performed by using different frequencies.

Figure 2:
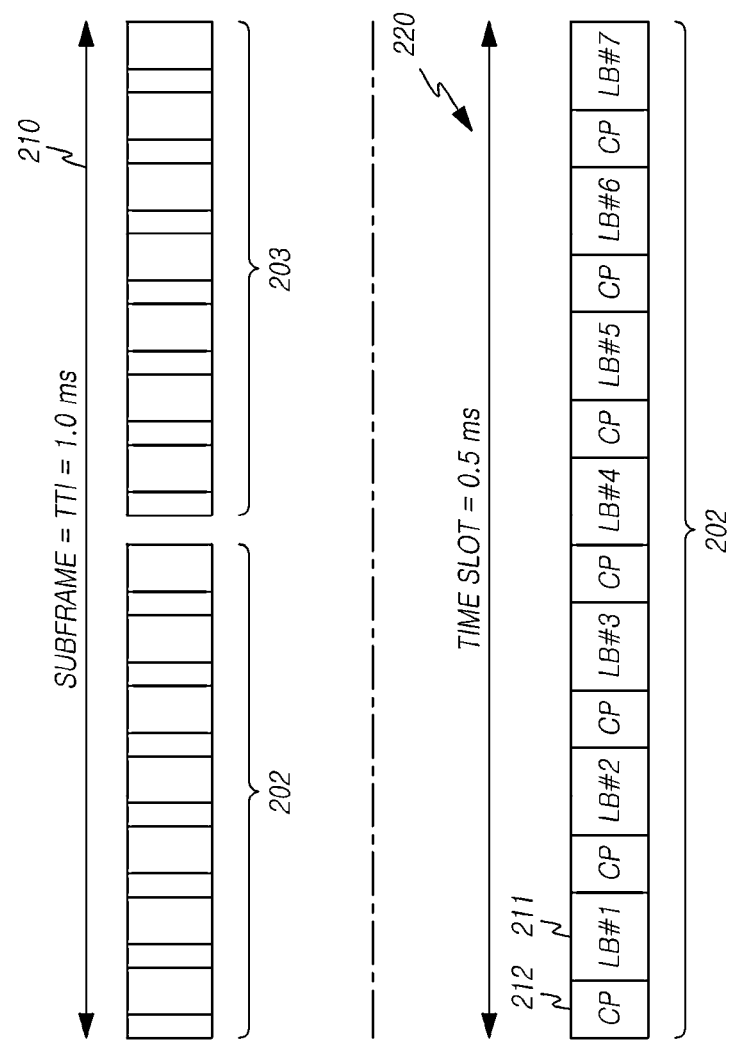
FIG. 2 is a view showing a structure of a subframe and time slot for data transmission and a typical structure of a time slot, which may be applied to an exemplary embodiment of the present invention.

FIG. 2 is a view showing a structure of a subframe and time slot for data transmission and a typical structure of a time slot, which may be applied to an exemplary embodiment of the present invention.

Referring to FIG. 2, one radio frame includes 10 subframes, and one subframe includes 2 time slots 202 and 203. The subframe is a basic unit of data transmission, and downlink or uplink scheduling is performed on a per-subframe basis. One slot may include 7 or 6 OFDM symbols in the time domain, and may include 12 subcarriers in the frequency domain.

For example, when a subframe has a normal Cyclic Prefix (CP) configuration, the time slot 202 may include 7 long blocks (LBs) 211. A time-frequency domain defined by one slot as described above may be called a Resource Block (RB). One radio frame has a length of 10 ms and is divided into 10 TTIs (Transmission Time Intervals). Accordingly, the terms "TTI" and "subframe" may be used as having the same meaning.

Meanwhile, in a next-generation communication system according to the present invention, in the case of uplink, a DeModulation Reference Signal (DM-RS) and a Sounding Reference Signal (SRS) are defined. In the case of in downlink, 3 Reference Signals (RSs), such as a Cell-specific Reference Signal (CRS), a Multicast/Broadcast over Single Frequency Network Reference Signal (MBSFN-RS) and a UE-specific reference signal, are defined. Herein, the SRS performs the same function as a pilot channel for an uplink channel.

Hereinafter, this specification discloses a method for aperiodically transmitting and receiving a control signal, and particularly, describes a channel estimation reference signal or an SRS as an example of the control signal. However, the present invention should not be limited to the SRS or the channel estimation reference signal, but should be understood as a concept including all types of control signals used in uplink or downlink.

An SRS includes not only a frequency band to be used by each UE, but also uplink channel information on an entire frequency band (entire subcarrier band) including a frequency band having a possibility of being used by a UE.

An SRS sequence is generated by equation (1) below, and the generated SRS sequence is subjected to resource mapping according to predetermined criteria, and is transmitted is according to a subframe configuration as shown in Table 1 below.

$$r^{SRS}(n) = r_{u,v}^{(\alpha)}(n) = e^{j\alpha n} \bar{r}_{(u,v)}(n), \text{ and } 0 \leq n \leq M_{sc}^{RS} \quad (1)$$

In equation (1), $M_{sc}^{RS} = mN_{sc}^{RB}$ is the length of a reference signal sequence, $1 \leq m \leq N_{RB}^{max,UL}$, u is a PUCCH sequence group number, v is a base sequence number, and a Cyclic Shift (CS)

$$\alpha = 2\pi \frac{n_{SRS}^{CB}}{8}.$$

$n_{SRS}^{CB}$ which has an integer value of 0 to 7, is set for each UE by an upper layer.

TABLE 1

| srsSuframeConfiguration | Binary | Configuration Period $T_{SFC}$ (subframes) | Transmission Offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | Inf | N/A |

Table 1 is a table for configuring a subframe of an FDD Sounding Reference Signal (SRS). In Table 1, each format named "srsSubframeConfiguration" is defined by 4 bits. Table 1 prescribes a transmission cycle and an offset of an actual transmission subframe in each case. Namely, if the value of srsSubframeConfiguration is, for example, 8 (1000 in binary), it implies that the SRS is transmitted in second and third subframes in every 5 subframes.

Figure 3:
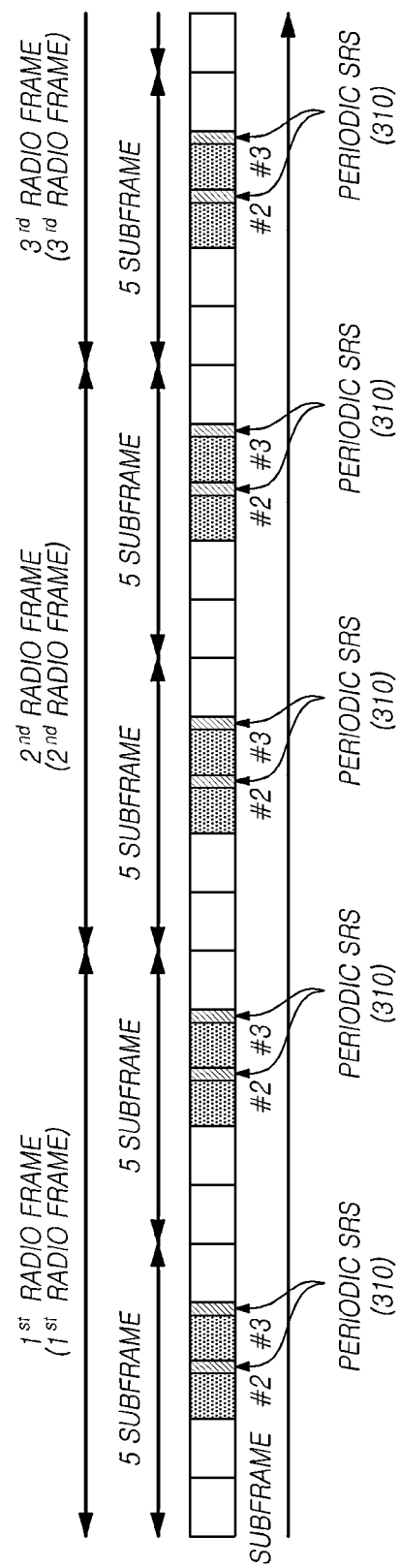
FIG. 3 is a view showing an example of the transmission of a periodic SRS, to which an exemplary embodiment of the present invention may be applied.

FIG. 3 shows an example of the transmission of a periodic SRS, to which an exemplary embodiment of the present invention may be applied.

First, when the value of srcSubframeConfiguration is 8 in Table 1, a configuration period is 5 subframes, and a transmission offset is {2,3}. Accordingly, an SRS 310 may be transmitted in a last symbol of each of subframes #2 and #3 in every 5 subframes. Herein, the SRS may be transmitted in a last symbol of each subframe. For example, when one subframe includes 14 symbols (in the case of a normal cyclic prefix), an SRS is transmitted in a $14^{th}$ symbol. Otherwise, when one subframe includes 12 symbols (in the case of an extended cyclic prefix), an SRS is transmitted in a $12^{th}$ symbol. In this specification, it goes without saying that the position of a symbol, at which an SRS is transmitted, is not limited to these examples. In other words, an SRS is periodically transmitted at a particular position of a radio frame or according to a transmission cycle, in each cell (base station).

Meanwhile, according to the evolution of communication systems, a communication system and the like, in which the number of antennas increases as in a Multi-Input Multi-Output antenna system (MIMO) and a relevant UE needs to transmit/receive a reference signal to/from a neighbor cell as well as a current serving cell as in a cooperative multi-point transmission/reception system, namely, a Cooperative Multi-Point (CoMP), are introduced. In this regard, a scheme for transmitting a periodic SRS has difficulty in securing sufficient transmission of an SRS. Therefore, it is required to extend the transmission of the SRS.

In this regard, this specification is intended to disclose a method, in which a periodically transmitted SRS may be aperiodically adjusted and thereby, scheduling flexibility of the SRS increases, and the increase in the scheduling flexibility seeks an improvement in the transmission of the SRS. First, a description will be made of a one-shot SRS, an SRS going through a DM-RS (Demodulation Reference Signal), and an SRS using a PUSCH region, as schemes in each of which an aperiodic SRS is transmitted, to which the present invention is applied.

Figure 4:
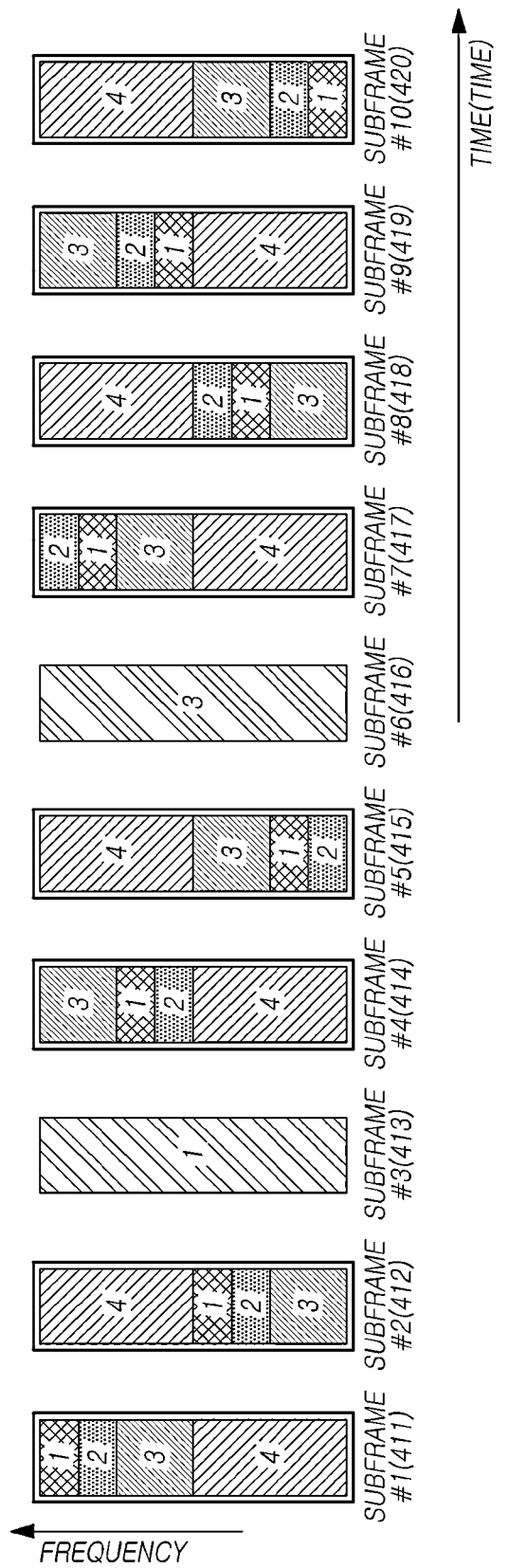
FIG. 4 is a view showing a one-shot scheme corresponding to an example of an aperiodic SRS.

FIG. 4 shows an example of the case of transmitting an aperiodic SRS of a one-shot scheme, to which the present invention is applied.

Referring to FIG. 4, a number within each of subframes 411, 412, . . . , and 420 signifies identification information of a UE which transmits an SRS in a relevant frequency domain. FIG. 4 shows transmitting a periodic SRS in a frequency domain allocated to each of a UE #1, a UE #2, a UE #3 and a UE #4. Herein, unique parameters which are set for the UE #1, the UE #2, the UE #3 and the UE #4, respectively, are different. Accordingly, SRS transmission bands of the UE #1, the UE #2, the UE #3 and the UE #4, which are calculated from the unique parameters, respectively, may be differently set.

Meanwhile, in subframes 413 and 416 the UE #1 and the UE #3 transmit an aperiodic SRS in a one-shot scheme. In this case, it is possible to avoid a collision with the transmission of a periodic SRS. Herein, an aperiodic SRS may not be transmitted in a subframe where a periodic SRS is not transmitted, and an aperiodic SRS may be transmitted in a subframe where a periodic SRS is transmitted. When a particular UE transmits an aperiodic SRS in the subframe where the periodic SRS is transmitted, it is possible to implement that the UE is assigned a priority and thereby transmits an aperiodic SRS or a periodic SRS in such a manner as to meet conditions.

As a result, due to the transmission of a periodic SRS, the UE #1 is set to transmit an SRS in a BW obtained by dividing a frequency band, namely, a bandwidth (BW) of an entire system, by 8. Accordingly, only when the UE #1 transmits an SRS eight times, sounding may be performed over the entire BW. However, the base station may detect channel information on the UE #1 by using an aperiodic SRS of the one-shot scheme.

Figure 5:
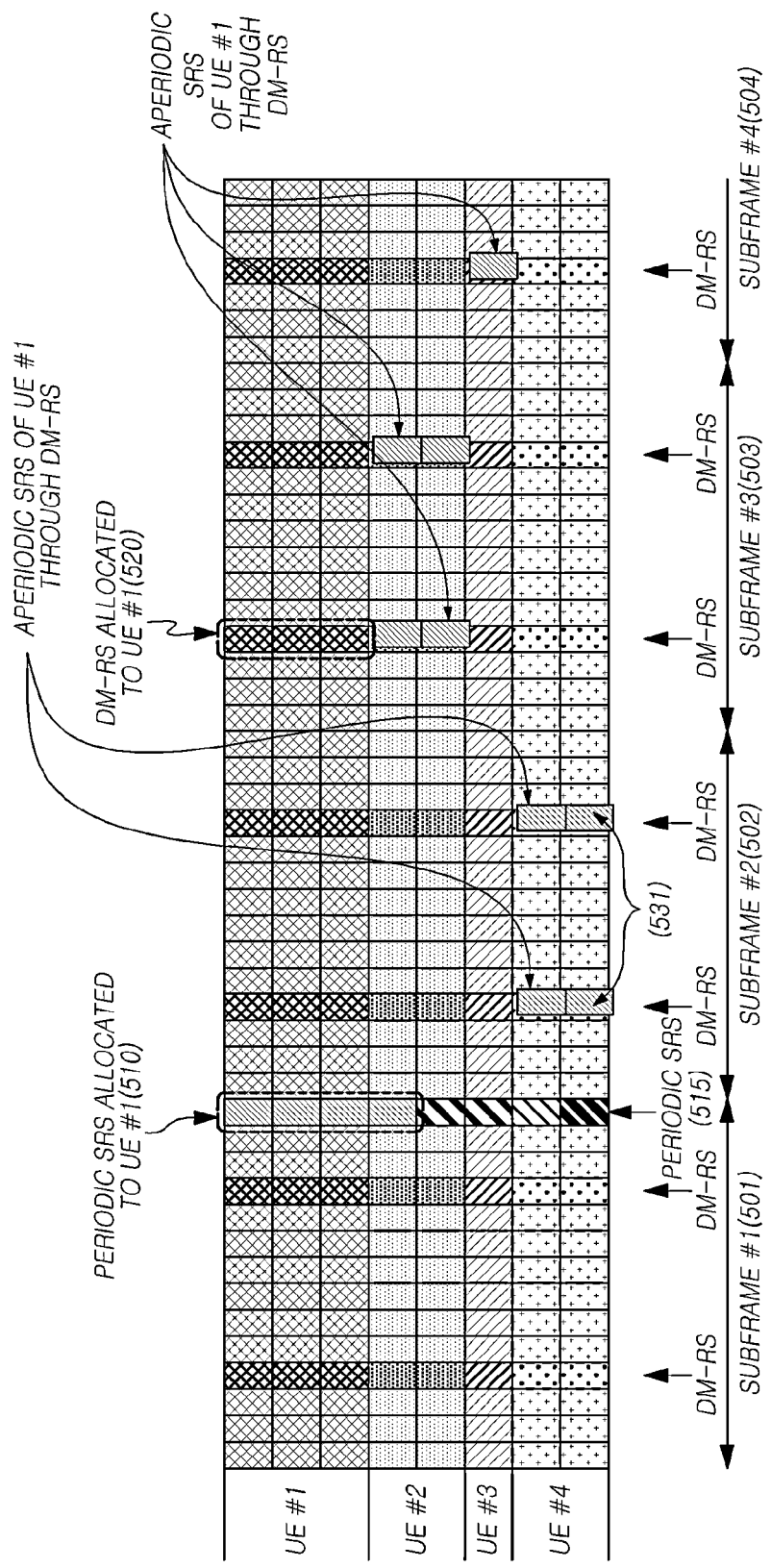
FIG. 5 is a view showing the transmission of an aperiodic SRS using a DM-RS (Demodulation Reference Signal) according to an embodiment of the present invention.

FIG. 5 shows an example of the case of transmitting an aperiodic SRS via a DM-RS, to which the present invention is applied.

Referring to FIG. 5, each of 4 UEs, such as the UE #1, the UE #2, the UE #3 and the UE #4, is in a state of being set to transmit a DM-RS through 2 symbols per subframe in a resource region (RBs) allocated by the base station, for uplink data transmission.

At this time, in order to transmit a periodic SRS, the UE #1 uses 4 RBs 510 in a last symbol 515 of a first subframe 501. Herein, a resource allocated for an SRS may not be identical to a PUSCH (Physical Uplink Shared CHannel) resource allocated to each UE. Meanwhile, in order to transmit an aperiodic SRS, the UE #1 transmits an SRS by using a resource region 531 for a DM-RS, which the UE #4 is allocated in a second subframe 502.

Also, when an Orthogonal Cover Code (OCC) is used, the OCC causes orthogonality to another signal to be maintained. Accordingly, while each UE transmits a DM-RS in a resource region allocated to a relevant UE, each UE may transmit an aperiodic SRS. This configuration includes transmitting an aperiodic SRS without precoding an unused DM-RS code point.

Figure 6:
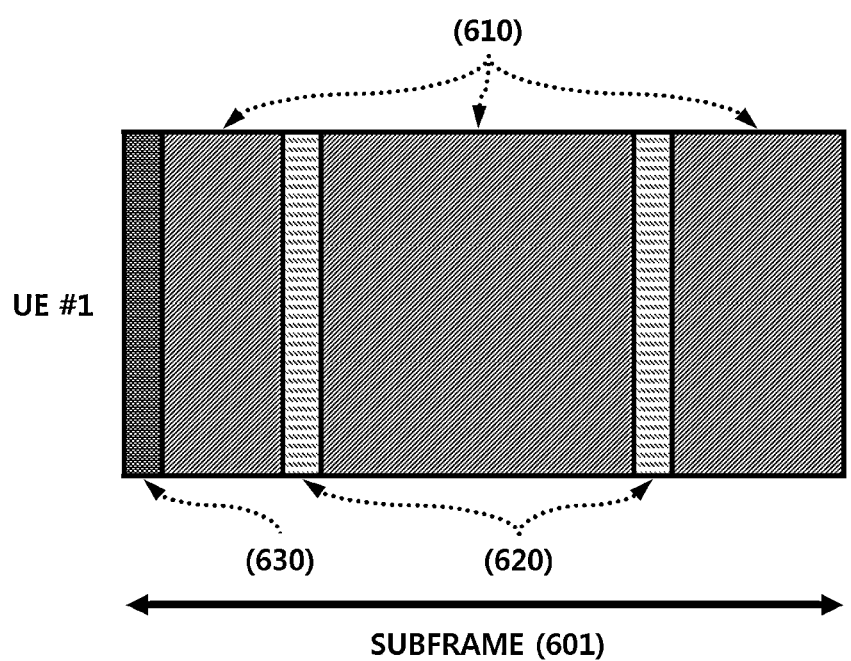
FIG. 6 is a view showing the transmission of an aperiodic SRS in a PUSCH region according to an embodiment of the present invention.

FIG. 6 is a view showing the transmission of an aperiodic SRS in a PUSCH region, to which the present invention is applied.

Referring to FIG. 6, a first symbol region of a PUSCH region in one subframe 601 is punctured, so that an SRS symbol 630 may be transmitted. Namely, an SRS is transmitted by using a PUSCH region 610 corresponding to a region other than a symbol position 620 of a DM-RS. At this time, it is desirable to puncture pure data except for a position for transmitting essential control data even in the PUSCH region.

As described above with reference to FIGS. 4, 5 and 6, the present invention may aperiodically adjust the transmission of an SRS, and thereby may increase the scheduling flexibility of an SRS. Accordingly, the present invention can provide an effect such that the increase in the scheduling flexibility improves SRS capacity. However, an inefficient problem may occur in actually operating resources, and this inefficient problem is as follows.

More specifically, the scheme for transmitting an aperiodic SRS as shown in FIG. 4 has an advantage in that it may estimate a channel within a short time period, but has a restriction such that a one-shot SRS must be transmitted only in a subframe where a periodic SRS is not set. Namely, the scheme for transmitting an aperiodic SRS as shown in FIG. 4 has a restriction such that a scheduler must schedule a time point of transmitting a one-shot SRS while it avoids a collision. When the value of srsSubframeConfiguration is equal to 0 in Table 1 and there exists a cell which is set to enable the transmission of an SRS in each subframe, the relevant UE always transmits a periodic SRS in each subframe. Accordingly, specifically, there may exist a restriction such that an aperiodic SRS may not be transmitted in the one-shot scheme. Namely, a subframe of a length of milliseconds must be avoided with respect to a periodic SRS in order to transmit a one-shot SRS. Accordingly, when use is made of a resource other than a subframe for transmitting a periodic SRS, puncturing is required as in the case of transmitting an SRS by using a PUSCH.

Meanwhile, when an aperiodic SRS is transmitted by using a DM-RS symbol as shown in FIG. 5, there is an advantage in that a collision with other UEs may be avoided. However, when the number of layers of SU-MIMO (Single User Multiple Input Multiple Output) is at least two or more, or in the case of MU-MIMO (Multiple User Multiple Input Multiple Output), even in the case of using the OCC, it is impossible to discriminate between OCCs for different layers or multiple UEs. Accordingly, there is a disadvantage in that it is impossible to actually obtain the effect of using the OCC.

Also, when an aperiodic SRS is transmitted by using the partial region of a PUSCH as shown FIG. 6, there is an advantage in that a resource other than an existing SRS may be utilized and the aperiodic SRS may be transmitted without a collision of the aperiodic SRS with an existing SRS. However, there is a disadvantage in that puncturing a PUSCH data region causes data loss to occur. Accordingly, when the PUSCH region is used, there may occur a restriction such that a low coding rate must be applied by using a frequency band in which data may be successfully recovered through puncturing, namely, an MCS field of DCI (Downlink Control Information) format 0 received from the base station or a restriction such that a modulation order is kept low and thereby, puncturing must be performed in a frequency domain where decoding is successfully performed. Besides, when a burst SRS is transmitted during a predetermined time period, there occurs a restriction such that the transmission of an SRS has the characteristics of transmission of another periodic SRS and thus, has difficulty in properly supporting the transmission of an aperiodic SRS according to an embodiment of the present invention.

For example, a case where each of UEs uses 4 antennas requires four times as many SRS resources as a case where a UE uses one antenna. Accordingly, each UE using the 4 antennas may not be provided with a sufficient SRS resource. Accordingly, in order to maximize the efficiency of a resource for transmitting an aperiodic SRS by each UE using the 4 antennas, it is necessary to meet the following conditions for transmission of an aperiodic SRS.

i) A resource other than an existing resource allocated for transmission of an SRS must be actively utilized, ii) an aperiodic SRS is transmitted during one-shot (a time period of one subframe) or during a sufficiently short time period, so that channel information must be able to be obtained within a short time period, iii) the number of blind decodings of an existing PDCCH should not be increased, and iv) data loss of a PUSCH must be kept to a minimum.

In this regard, this specification describes a method for improving the performance of an aperiodic SRS so as to be suitable for network conditions. In a wireless communication system, this specification is intended to provide a method for aperiodically transmitting a control signal for estimating a state of a resource, particularly, an SRS, and a method for efficiently transmitting and receiving an aperiodic control signal according to the state of a wireless channel and that of a UE so as to transmit an SRS within a short time period in an entire bandwidth. Particularly, this specification is intended to provide a method for instructing the avoidance of a collision between an aperiodic control signal and another signal.

For example, in a scheme for using a DM-RS symbol during transmission of the aperiodic SRS, an SRS is transmitted through one antenna, and a PUSCH resource may not be consumed even while a resource other than an SRS resource region is used. However, in the scheme for using the position of a DM-RS symbol, an SRS may be transmitted by using an OCC. However, the scheme may have a restriction such that the relevant UE must be a UE which uses layers of the SU-MIMO, the number of which is equal to or less than 1 or 2. Accordingly, an embodiment of the present invention proposes a scheme, in which an SRS using a DM-RS is transmitted only in a maximum frequency band where the SRS may be transmitted by using the DM-RS, and in which an aperiodic SRS is transmitted in such a manner as to combine the use of a PUSCH region using puncturing and that of an existing SRS symbol region in the remaining frequency band.

Figure 7:
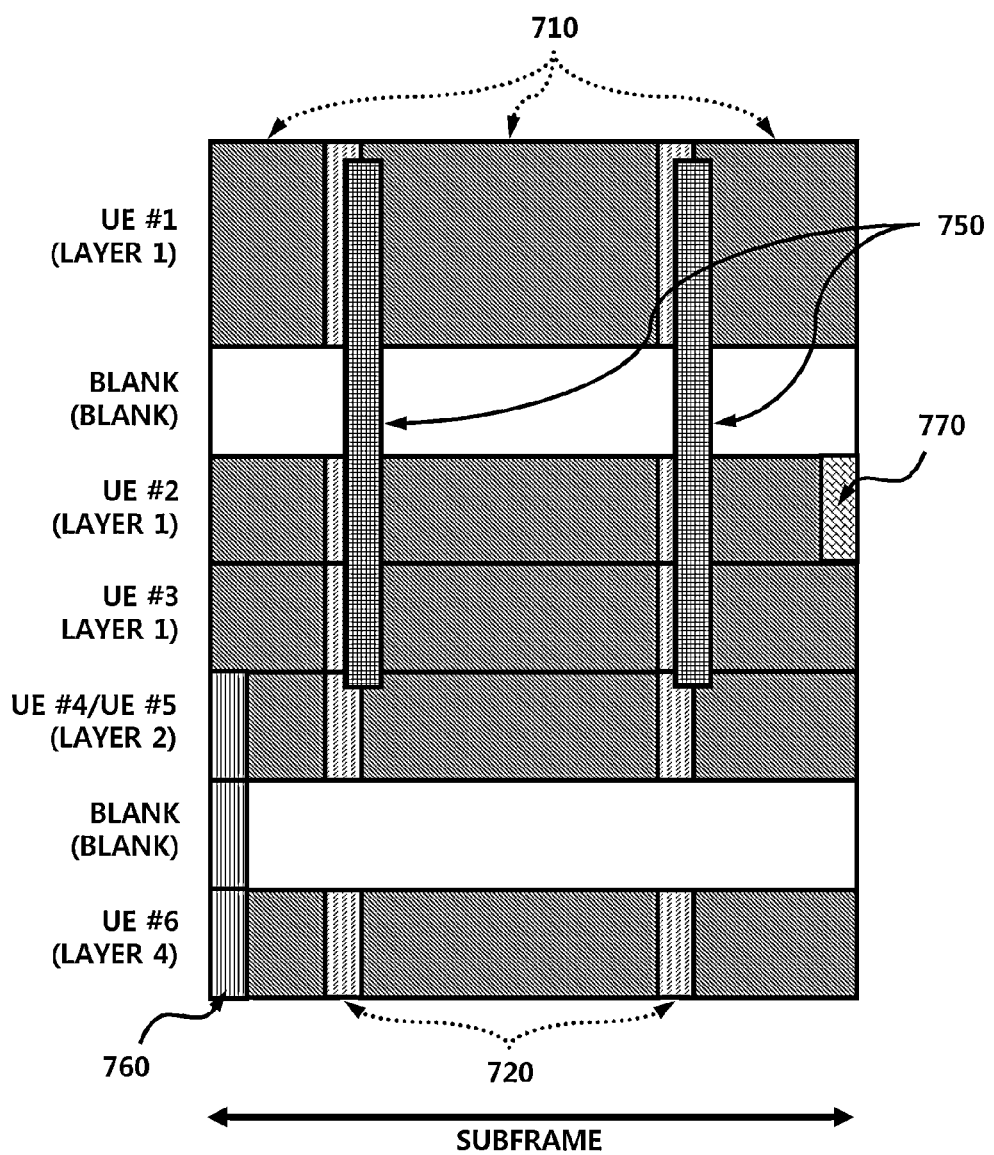
FIG. 7 is a view showing transmitting of an aperiodic SRS in such a manner as to combine an SRS using a DM-RS with an SRS using a PUSCH region according to an embodiment of the present invention.

FIG. 7 is a view showing a case where an aperiodic SRS is transmitted in such a manner as to combine an SRS using a DM-RS with an SRS using a PUSCH region according to an embodiment of the present invention.

Referring to FIG. 7, a layer 1 represents a case where one layer is used. A case where two UEs are represented in one frequency band is an embodiment, to which the MU-MIMO is applied. A region denoted by reference numeral 710 signifies a PUSCH region, and a region denoted by reference numeral 720 signifies a region for transmitting a DM-RS.

The UE #1, the UE #2, and the UE #3 use a SU-MIMO of layer 1. Accordingly, in a frequency band allocated to the UEs #1, #2 and #3, the UE #2 may transmit an SRS by using a DM-RS as denoted by reference numeral 750. This is because a frequency band using the SU-MIMO layer 1 enables the use of an OCC and enables multiple UEs to transmit signals. Namely, the present invention enables another UE to transmit an SRS by using a region for transmitting a DM-RS, and thereby enables an aperiodic transmission of the SRS.

Meanwhile, a frequency band where, for example, a UE #6 uses layers, the number of which is equal to or more than 3, or a frequency band where, for example, the UE #4 and a UE #5 use the MU-MIMO, has difficulty in discriminating between signals transmitted by multiple UEs by using an OCC. Accordingly, the frequency band has difficulty in transmitting an SRS by using the DM-RS region.

Accordingly, only in a frequency band used by the UE #1, the UE #2 and the UE #3, an SRS is transmitted by using the DM-RS region as denoted by reference numeral 750. In the remaining frequency band, an SRS is transmitted by using the PUSCH region as denoted by reference numeral 760.

Meanwhile, signaling for an instruction for instructing the UE #2 to transmit an SRS by using the DM-RS region may be performed by using 1 bit among remaining code points of an RA field of a DCI format 0. Accordingly, it is possible to give an implicit notice without increasing the number of times of blind decoding of uplink allocation (namely, uplink grant). As a similar scheme, use may be made of a scheme for using 1 bit added for SPS (Semi-Persistent Scheduling). A signaling scheme for instructing the transmission of an SRS may use the DCI format 0, and may utilize a new DCI format.

A unit of resource according to a scheme for designating a BW for transmitting an SRS is larger than a unit of resource, in which a UE is actually allocated a resource. Accordingly, a BW of an SRS resource may be represented by using bits, the number of which is less than that of bit information of already-used RA (Resource Allocation). Accordingly, currently, a BW for an SRS may be designated by using remaining code points of the DCI format 0. Herein, the use of code points implies that the value of an unused part among N bits is used to indicate information other than particular information when the N bits have been allocated to the particular information but the number of types of actually-used information is less than 2N. For example, when 3 bits have been allocated to particular information but actually-used information corresponds to 0 to 6, new information may be allocated to code points 7 and 8.

In other words, when a DCI format 0, which designates an SRS BW for an aperiodic SRS in order to prevent an increase in an unnecessary PDCCH, is given downwards to a UE allocated a resource in each subframe without using an SPS, a scheme in which the UE first recognizes the DCI format 0 not as resource allocation for actual data transmission but as resource allocation for an SRS and then uses, as a resource for data, a resource allocated to the UE in a previous subframe as it is, may also be applied to an embodiment of the present invention.

A process for using a DCI format 0 according to an embodiment of the present invention will be described below.

For example, information of 13 bits is required to designate a resource with a frequency band of 20 MHz (100 RBs). Accordingly, an RA field of the DCI format 0 is defined by 13 bits.

Herein, a code point may be applied to the RA field of 13 bits to be used. Namely, because a range of information used for resource allocation is 0 to 5049, remaining code points from 5050 to 8191 (approximately 11 bits) may be used as information bits for transmitting an SRS. In this regard, because a minimum unit of a BW used to transmit an SRS is 4 RBs, information of about 9 bits may be used to designate a BW required to transmit an SRS in a frequency band of 100 RBs.

Accordingly, in the present invention, the transmission of an SRS is controlled by using remaining code points (11 bits) among information bits used for RA. Therefore, when the UE identifies that the value of a received RA field is equal to or greater than 5050, the UE may identify that the value of the relevant RA field is instruction information for instructing the transmission of an aperiodic SRS. Also, a value obtained by subtracting 5050 from the received bit information is used as information on the transmission of an aperiodic SRS.

Meanwhile, in a remaining BW other than a BW for transmitting an SRS using a DM-RS, an SRS may be transmitted by using the PUSCH region as denoted by reference numeral 760. When the PUSCH region is used, it is required to notify other UE #4, UE #5 and UE #6 in a frequency band, in which an SRS is transmitted, that they are to puncture or hold relevant symbols, through signaling.

In this case, it is required to simultaneously signal to the multiple UEs, and thus a DCI format 3/3A may be used to notify the multiple UEs. For example, when a scheme for transmitting a power control bit is used, it is possible to prevent an increase in PDCCH overhead. Also, when a DCI format 3/3A is used, it is possible to signal to a UE, on which SPS scheduling is performed, in order to perform puncturing or holding. In this regard, when use is made of the DCI format 0 (namely, uplink allocation), it is impossible to signal to an SPS UE in each subframe. Accordingly, the DCI format 3/3A is also used to semi-persistently signal to the SPS UE.

In other words, the DCI format 0 may be used for the puncturing or holding. In this case, there are disadvantages in that the number of times of transmission of a PDCCH may become greater than in the case of using the DCI format 3/3A and it is impossible to signal to an SPS UE.

However, when the DCI format 0 is used, there is an advantage in that SRS triggering and puncturing (holding) of an aperiodic DM-RS may be used in one signaling format. Accordingly, a UE which is scheduled to transmit a signal in a region where an aperiodic SRS is to be transmitted, may be instructed to puncture or hold a signal through the DCI format 0. At this time, a remaining code point of the RA field may be used as a bit instructing the puncturing (or holding), and the bit instructing the puncturing (or holding) may be transmitted in an implicit scheme by using another field in the DCI format 0. Namely, when the remaining code point is used, without increasing a separate PDCCH, information which instructs the relevant UE to perform puncturing or holding in the relevant PUSCH region simultaneously with performing UL (UpLink) allocation, may be transmitted to the relevant UE.

Meanwhile, the present invention proposes a method, in which remaining code points of the RA field are used in such a manner as to divide the remaining code points in order to transmit, in one scheme (for example, the DCI format 0), both the designation of a bandwidth for transmitting an SRS by using the DM-RS region and information which instructs puncturing or holding a signal transmitted in the PUSCH region.

For example, in the case of 20 MHz (100 RBs), code points from 6000 to 7000 among the remaining code points from 5050 to 8191 are used for designating a BW simultaneously with triggering an aperiodic SRS using a DM-RS. Also, a particular bit may be designated and used as a bit required for puncturing or holding. For example, because "1111111111111" is currently used for an SPS, a format of particular bits such as "1111111111110" may be utilized as a format of particular bits for instructing puncturing or holding.

However, a method for dividing code points has a disadvantage in that data region may not be allocated. In order to overcome this disadvantage, when Resource Allocation (RA) in an existing unit of 1 RB is changed, and RA is performed in a unit of 2 RBs or in a unit of multiple RBs according to the need, the number of bits required for the RA is reduced, so that a remaining bit may be utilized as information which instructs puncturing or holding. Otherwise, the PDCCH DCI format 0 includes extra bits which always remain, and one of the remaining bits may be utilized as a puncturing information bit. For example, when RA is performed in a minimum unit of 2 RBs in the case of 20 MHz (100 RBs), all cases may be expressed by using only 11 bits. Accordingly, the most significant bit or least significant bit which remains may be utilized as a puncturing bit.

When a signal transmitted in the PUSCH region is punctured by using the DCI format 0, in order to enable a successful recovery of a punctured symbol, an MCS (Modulation and Coding Scheme) field of the DCI format 0 is used to reduce a coding rate or a modulation level (modulation order), and thereby, data is robustly transmitted. As a result, it is possible to adjust a successful recovery of a signal received by a base station.

Also, according to another embodiment of the present invention, in the case of using the DCI format 0, while the existing RA field of the DCI format 0 is used as data resource allocation information, information which implicitly instructs puncturing or holding may be transmitted. In this case, in terms of signaling for puncturing or holding, no overhead occurs.

For example, in the case of 20 MHz (100 RBs), while the UE causes a minimum unit, in which RA is performed, to be 2 RBs as described above, when the UE receives RA information of 11 bits from 5050 to 8190, it recognizes a relevant DCI format 0 as a DCI format including puncturing information or holding information. When the 11-bit information is used, compared with a case where 13 bits are used to designate RA, a resource is somewhat roughly allocated. However, a resource is designated by using 11 bits and is then allocated only in one subframe for transmitting an aperiodic SRS, so that a serious problem does not occur in relation to RA.

Figure 16:
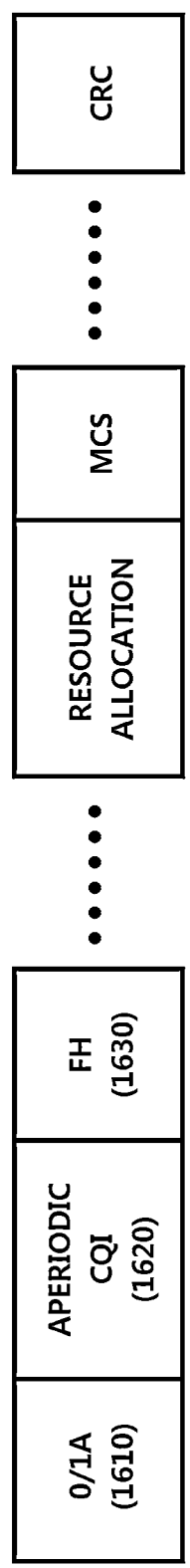
FIG. 16 is a view showing instruction information for controlling the transmission of an SRS by using a 0/1A field of format 0 according to an embodiment of the present invention.

In this regard, FIG. 16 illustrates information which instructs puncturing or holding by using a 0/1A field of format 0 according to an embodiment of the present invention.

Referring to FIG. 16, a 0/1A field 1610 of a DCI format 0 is an indicator field discriminating whether a transmitted DCI format is the DCI format 0 from whether the is transmitted DCI format is a DCI format 1A. Namely, the 0/1A field 1610 of the DCI format 0 is an indicator field determining whether the relevant DCI format corresponds to an uplink (format 0) or a downlink (format 1A). Meanwhile, the puncturing or holding is used in the transmission of an aperiodic SRS, namely, is used in uplink. Accordingly, in the present invention, the DCI format 0/1A field 1610 may be used as a field which represents puncturing information or holding information.

In order to indicate the puncturing field or the holding field, an aperiodic CQI (Channel Quality Indicator) field 1620 or a frequency hopping field 1630 may be used instead of the DCI format 0/1A field 1610. The aperiodic CQI field 1620 is used when CQI information is aperiodically transmitted. Herein, when it is assumed that an aperiodic SRS and an aperiodic CQI are not simultaneously transmitted, the aperiodic CQI field may be used to indicate the puncturing field or the holding field. Also, the frequency hopping field 1630 is a field indicating whether frequency hopping is performed. According to the present invention, the frequency hopping field 1630 may be used to indicate the puncturing field or the holding field. This is because an aperiodic SRS is transmitted in one subframe or in a minimum subframe and thus, an aperiodic CQI does not have to be transmitted in the relevant subframe or frequency hopping does not have to be performed therein.

As still another example, a filler bit may be used. The filler bit is a field used to cause the size of the DCI format 0 to coincide with that of the DCI format 1A. Because the is filler bits are first defined as 1 to 2 bits according to the size of a BW and are then used, the filler bits may be used as a puncturing or holding field for the aperiodic SRS. Accordingly, when the puncturing information or the holding information is set to be included in the DCI format 1A, a minimum amount of information required for uplink allocation may be transmitted through the DCI format 0 without being damaged.

Figure 8:
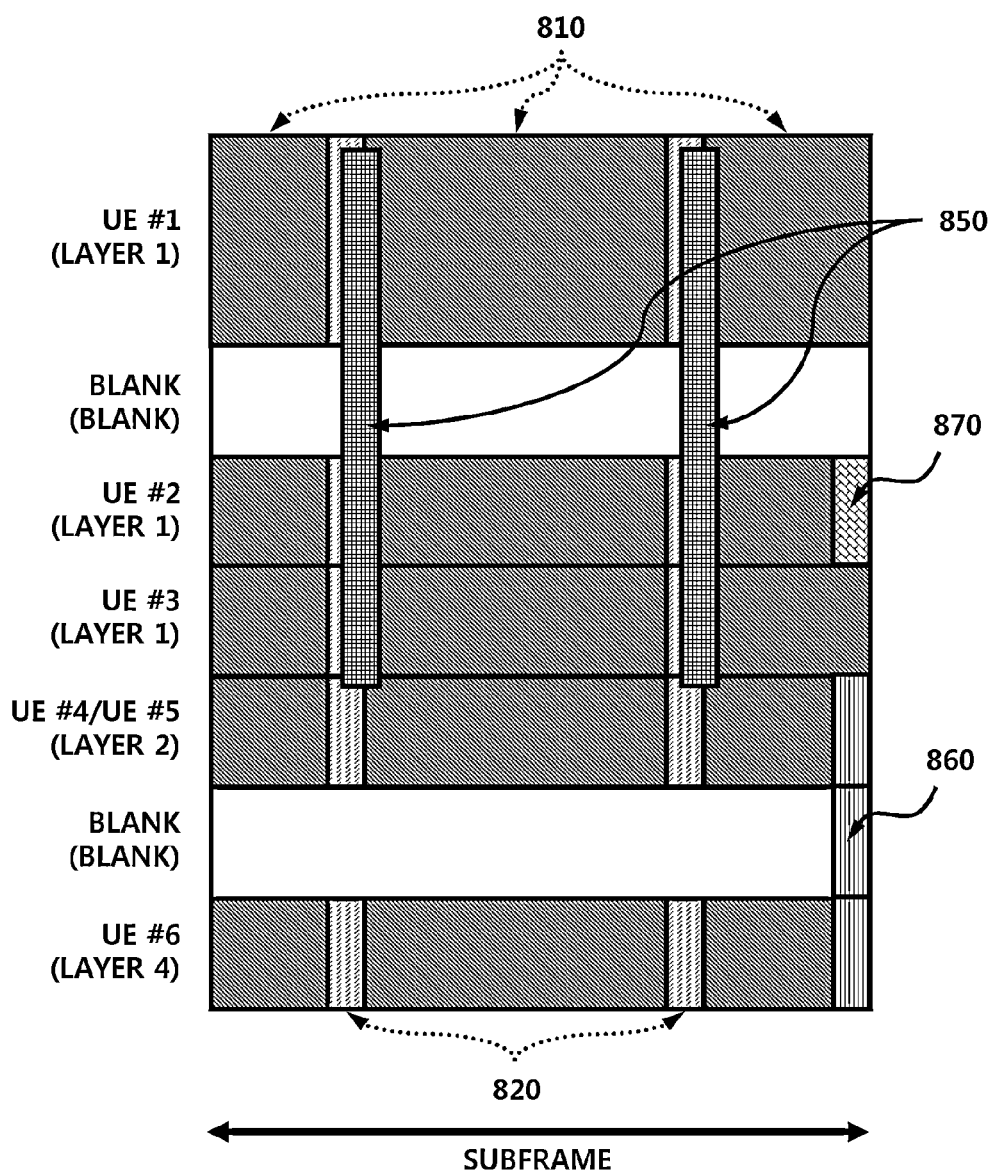
FIG. 8 is a view showing transmitting of an aperiodic SRS by using a DM-RS region and an existing SRS region according to another embodiment of the present invention.

FIG. 8 is a view showing a case where an aperiodic SRS is transmitted by using a DM-RS region and an existing SRS region according to another embodiment of the present invention. Namely, FIG. 8 illustrates a technique for combining transmitting of an SRS by using a DM-RS region with transmitting of an SRS by using a periodic SRS symbol.

Referring to FIG. 8, when a relevant subframe is a subframe which is set for a periodic SRS, the relevant subframe is located at the position of a periodic SRS symbol. In contrast, when the relevant subframe is a subframe which is not set for the periodic SRS, the relevant subframe becomes a last symbol of a typical PUSCH region. Namely subframes are classified into subframes in each of which a periodic SRS is transmitted, and subframes in each of which a periodic SRS is not transmitted.

The UE #1, the UE #2 and the UE #3 use a SU-MIMO of layer 1. Accordingly, in a relevant frequency band, the UE #2 may transmit an SRS by using a DM-RS region as denoted by reference numeral 850. A description of this configuration will be replaced by the above description such that the technical idea of the present invention is applied to a signal used to transmit an OCC and two UEs may transmit signals in one frequency band. Also, in a frequency band of the UE #6 which uses layers, the number of which is equal to or more than 3, or in a frequency band where, for example, the UE #4 and the UE #5 uses a MU-MIMO, a region for transmitting an SRS symbol is used as denoted by reference numeral 860.

Namely, as compared with FIG. 7, FIG. 8 illustrates transmitting of an SRS by using a last symbol in one subframe as denoted by reference numeral 860. Meanwhile, when use is made of an SRS resource allocated to another UE and a resource allocated for another signal, a collision of signals may occur between UEs, each of which transmits an SRS. Accordingly, it is required to signal to each of the relevant UEs so that each of the relevant UEs punctures or holds an SRS at a predetermined position. Meanwhile, in FIGS. 7 and 8, a frequency band corresponding to a blank is an unused region, and thus, may be used to transmit an SRS without the need for signaling for instructing separate puncturing or holding.

It is possible to previously designate, through RRC signaling, whether a signal transmitted in a PUSCH region is to be punctured or whether a signal transmitted at the position of an existing SRS symbol is to be punctured. Otherwise, it may be designated by using a format of particular bits of remaining code points such as an SPS. For example, "1111111111110" may be defined as a format of particular bits for instructing puncturing or holding of a signal transmitted in the PUSCH region. Also, "1111111111100" may be defined as a format of particular bits for instructing puncturing or holding of a signal transmitted at the position of an SRS symbol.

Meanwhile, when transmitting of an aperiodic SRS by using a DM-RS region overlaps transmitting of a periodic SRS, a control operation may be performed so as to selectively transmit a periodic SRS according to channel conditions, or a control operation may be performed so as not to transmit the periodic SRS. In this case, transmitting of an SRS by using the DM-RS region needs to maintain continuity, so that puncturing may not be performed in the middle of the transmission. This is because a sequence generation technique different from an existing scheme is required to puncture a part where an SRS is transmitted by using the DM-RS region.

Figure 9:
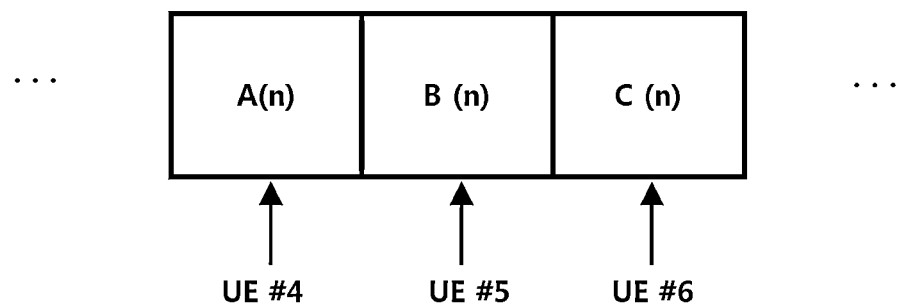
FIG. 9 is a view showing an example of signaling transmitted for puncturing or holding a PUSCH region or an existing SRS symbol used in FIGS. 7 and 8.

FIG. 9 illustrates an example of signaling which instructs puncturing or holding an existing SRS symbol/a PUSCH region applied to another UE in such a manner that a particular UE transmits an aperiodic SRS, according to an embodiment of the present invention.

Referring to FIG. 9, multiple UEs are simultaneously controlled by using a DCI format 3/3A. In the DCI format 3/3A, transmission power of a PUSCH/PUCCH may be controlled by using 1 bit or 2 bits (adjustment bits). Accordingly, according to the present invention, in order to puncture or hold a particular symbol for transmitting an SRS, after bits intended to be transmitted to the relevant UE are sequentially arranged, the sequentially arranged bits are encoded in such a manner that only the relevant UE may recognize the encoding, and then the encoded bits are transmitted to the relevant UE.

In other words, the base station may signal as shown in FIG. 9, and may simultaneously instruct the UE #4, the UE #5 and the UE #6 to puncture or hold a signal transmitted in a PUSCH region. It goes without saying that the base station may not perform signaling for puncturing or holding in a frequency band corresponding to an unused blank.

Accordingly, after the multiple UEs search for all regions of a PDCCH, in each of which the DCI format 3/3A is transmitted, each of the multiple UEs finds a field identical to encoding of itself, decodes the found field, and recognizes information on puncturing or holding. Accordingly, another UE transmits an aperiodic SRS in a PUSCH region which is punctured or held. In FIG. 9, each of A(n), B(n) and C(n) represents optional information, and represents n-bit information having a length equal to or longer than 1.

Figure 10:
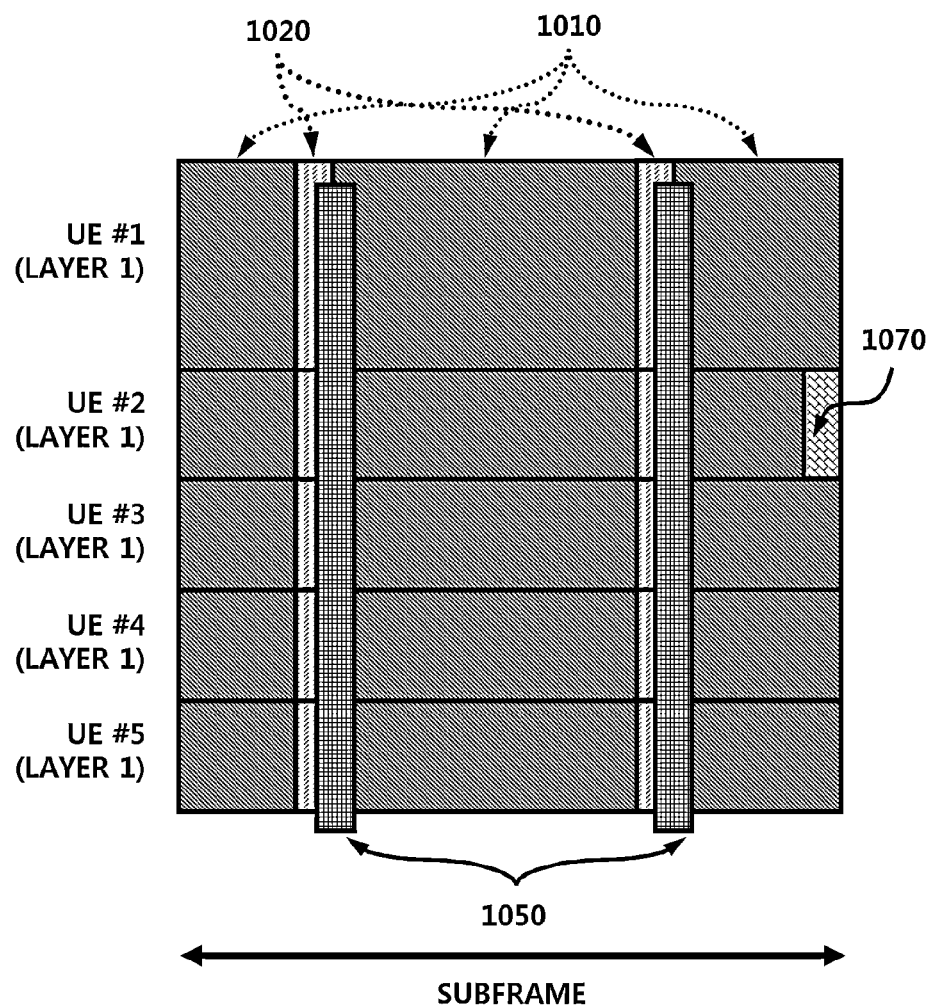
FIG. 10 is a view showing a process for transmitting an aperiodic SRS by using a DM-RS corresponding to layer 1 according to an embodiment of the present invention.

FIG. 10 is a view showing a process for transmitting an aperiodic SRS by using a DM-RS corresponding to layer 1 according to an embodiment of the present invention.

Referring to FIG. 10, UEs each capable of transmitting an SRS by using a DM-RS region are scheduled by a scheduler at a time point when an aperiodic SRS is required. The base station schedules regions, in which UEs transmit signals, so that the UE #2 may transmit an aperiodic SRS using a DM-RS. In this regard, when only UEs using SU-MIMO layer 1 are scheduled as shown in FIG. 10, an OCC may be used in an entire bandwidth. Accordingly, when the OCC is used, an aperiodic SRS 1050 may be transmitted by using a DM-RS 1020 region over the entire bandwidth in FIG. 10. Namely, it is possible to implement an aperiodic one-shot SRS using a DM-RS. In this case, even without using the combination technique proposed in this specification, it is possible to implement the aperiodic one-shot SRS using the DM-RS. Accordingly, there may be another technique satisfying the conditions of an aperiodic SRS as described above.

Figure 11:
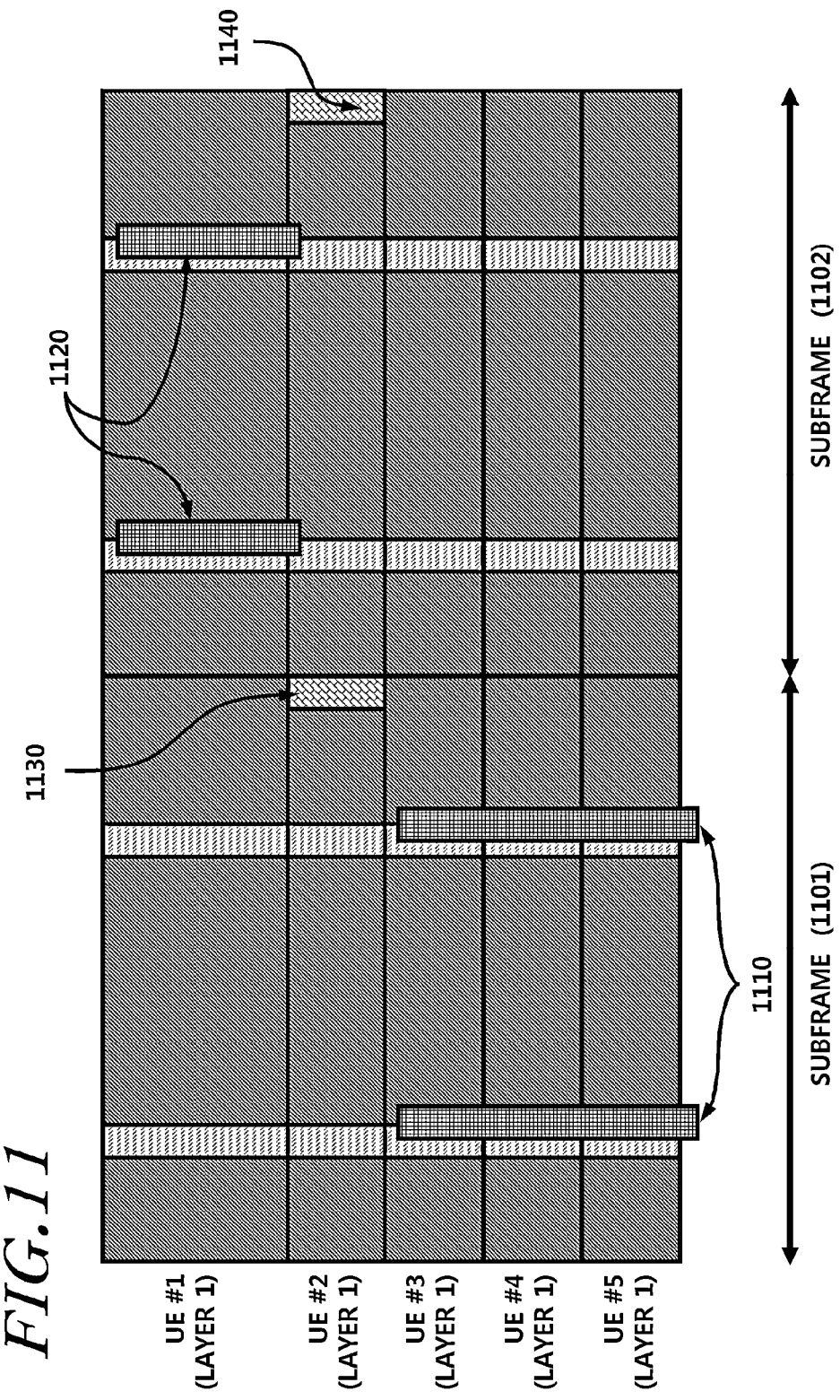
FIG. 11 is a view showing a process for transmitting an aperiodic SRS by using a DM-RS corresponding to layer 1 according to another embodiment of the present invention.

FIG. 11 is a view showing a process for transmitting an aperiodic SRS by using a DM-RS corresponding to layer 1 according to another embodiment of the present invention.

FIG. 11 illustrates a scheme, in which a periodic SRS scheduled for the UE #2 transmitting an aperiodic SRS is transmitted as it is as denoted by reference numerals 1130 and 1140, and in which an SRS is transmitted by using a DM-RS region as denoted by reference numerals 1110 and 1120 in a part of a remaining bandwidth.

In this case, an SRS may not be transmitted in the one-shot scheme differently from FIG. 10, but channel sounding may be performed within a sufficiently short time period of two subframes 1101 and 1102 as shown in FIG. 11. Also, decoding of a DM-RS by the UE #2 has a form in which a part causing interference is removed, so that it is possible to obtain an improvement in performance.

Figure 12:
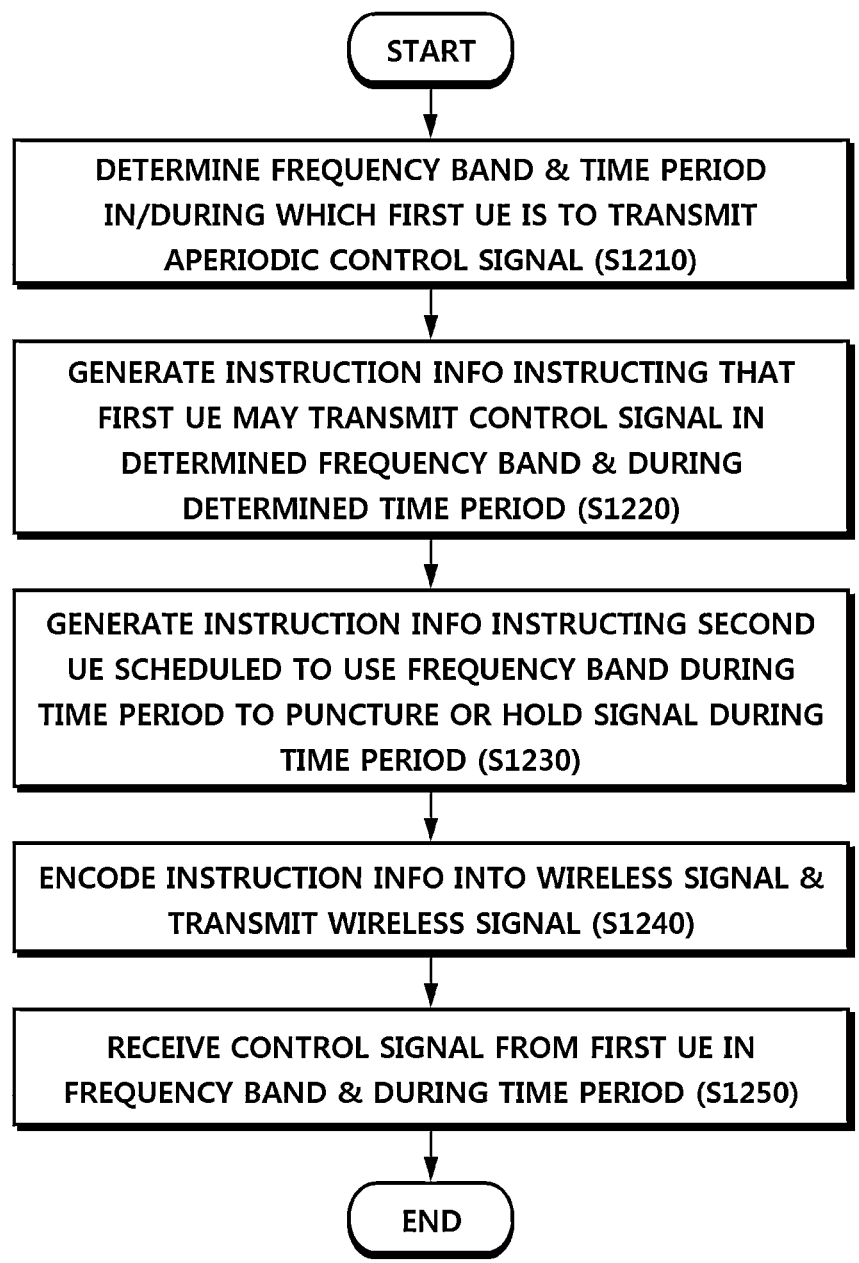
FIG. 12 is a flowchart showing a process for instructing an aperiodic transmission of a control signal or instructing the avoidance of a collision with an aperiodic transmission according to an embodiment of the present invention.

FIG. 12 is a flowchart showing a process for instructing an aperiodic transmission of a control signal or instructing the avoidance of a collision with an aperiodic transmission according to an embodiment of the present invention.

FIG. 12 illustrates a process, in which the base station instructs a first UE transmitting an aperiodic SRS to transmit an aperiodic SRS, and in which the base station instructs each of second and third UEs allocated a region for transmitting a DM-RS/a PUSCH region/a region for transmitting a periodic SRS, which overlap a region where the first UE transmits an aperiodic SRS, to hold or puncture the transmission of a signal.

Herein, the second UE is an apparatus for transmitting a DM-RS in the region for transmitting a DM-RS, or the PUSCH region, or the region for transmitting a periodic SRS, which overlaps the region for transmitting an aperiodic SRS, or for transmitting a signal through a PUSCH channel, or for transmitting a periodic SRS. The third UE is an apparatus for transmitting a DM-RS in the region for transmitting a DM-RS, which overlaps the region for transmitting an aperiodic SRS. Because an OCC may be applied to the transmission of a DM-RS, separate instruction information is not transmitted to the third UE.

Referring to FIG. 12, the base station determines whether the first UE is to transmit an aperiodic SRS in a frequency band and during a time period, which are allocated to the second UE (S1210). Step S1210 includes determining whether a particular UE is to transmit an aperiodic SRS according to the one-shot scheme in one subframe or in two subframes.

The base station generates instruction information for instructing that the first UE may transmit the SRS in the determined frequency band and during the determined time period (S1220). The instruction information may be transmitted in various schemes. For example, the instruction information may be transmitted by using a DCI format. Otherwise, the instruction information may be transmitted in the form of information, which includes or indicates information on a frequency band and a time period allocated to another UE, through a data region of another channel. It goes without saying that an aperiodic sounding reference signal may be instructed to be transmitted in a DCI format 0 by using a code point.

Meanwhile, a region where the first UE is to transmit an SRS, includes a region that the first UE is not allocated but the second UE and the third UE are allocated, as described above. Accordingly, the base station generates instruction information which instructs puncturing or holding the transmission of a signal by the second UE during a time period allocated to the second UE (S1230). Herein, the third UE which is a UE for transmitting a demodulation reference signal, is discriminated from another UE through an OCC, so that separate instruction information is not transmitted to the third UE. However, step S1230 is required for the second UE, in which the region for transmitting an aperiodic reference signal overlaps the PUSCH region or the region for transmitting a periodic sounding reference signal. Accordingly, the base station may generate instruction information which instructs puncturing or holding a signal.

Then, the base station transmits the multiple pieces of instruction information to the first UE and the second UE (S1240). Herein, the multiple pieces of instruction information include first instruction information for instructing the first UE, and second instruction information for instructing the second UE. The first instruction information and the second instruction information may first be distinguished from each other, and may then be transmitted. Otherwise, the first instruction information and the second instruction information may be transmitted to the first UE and the second UE according to different transmission schemes, respectively. The multiple pieces of instruction information may all be transmitted through a physical channel. As described above, the first instruction information may be transmitted by using a code point of an RA field of a DCI format 0. The second instruction information may be transmitted by using a power control bit of a DCI format 3/3A.

Thereafter, the base station receives an aperiodic control signal transmitted by the first UE during the predetermined time period in the frequency band allocated to the second UE and the third UE (S1250).

More specifically, a time period during which the first UE transmits an aperiodic SRS may be scheduled to overlap a time point when the third UE transmits a demodulation reference signal, namely, a DM-RS.

For example, as shown in FIG. 7, the frequency band may include a frequency band allocated to the second UE, and the time period may become a time point when the third UE transmits a signal including data, namely, a time point of transmitting data of a PUSCH. This configuration may be applied when the third UE corresponds to the UEs #1, #2 and #3 of FIG. 7 and the second UE corresponds to the UEs #4, #5 and #6 of FIG. 7.

It goes without saying that as shown in FIG. 8, the frequency band may include a frequency band allocated to the second UE and the time period may become a time point when the second UE transmits a periodic control signal, namely, an SRS. This configuration may be applied when the third UE corresponds to the UEs #1, #2 and #3 of FIG. 8 and the second UE corresponds to the UEs #4, #5 and #6 of FIG. 8.

Also, as shown in FIG. 10 or FIG. 11, use may be made of a time period during which the multiple UEs (UEs #1, #2, #3, #4 and #5) transmit DM-RSs. In this regard, as shown in FIG. 10, the UE #2 may transmit an aperiodic SRS in a frequency domain allocated to the multiple UEs (UEs #1, #3, #4 and #5) in one subframe. As shown in FIG. 11, a UE may transmit an aperiodic SRS in two subframes. In this case, the multiple UEs (UEs #1, #3, #4 and #5) correspond to any one of the second UE and the third UE, but the multiple UEs all transmit DM-RSs. Accordingly, each of the multiple UEs does not need to separately hold or puncture a signal.

Namely, referring to FIG. 11, in a first subframe, the UE #2 may transmit an aperiodic SRS in a frequency band and at a time point that the UEs #3, #4 and #5 are allocated so as to transmit DM-RSs. In a second subframe, the UE #2 may transmit an aperiodic SRS in a frequency band and at a time point that the UE #1 is allocated so as to transmit a DM-RS.

Figure 13:
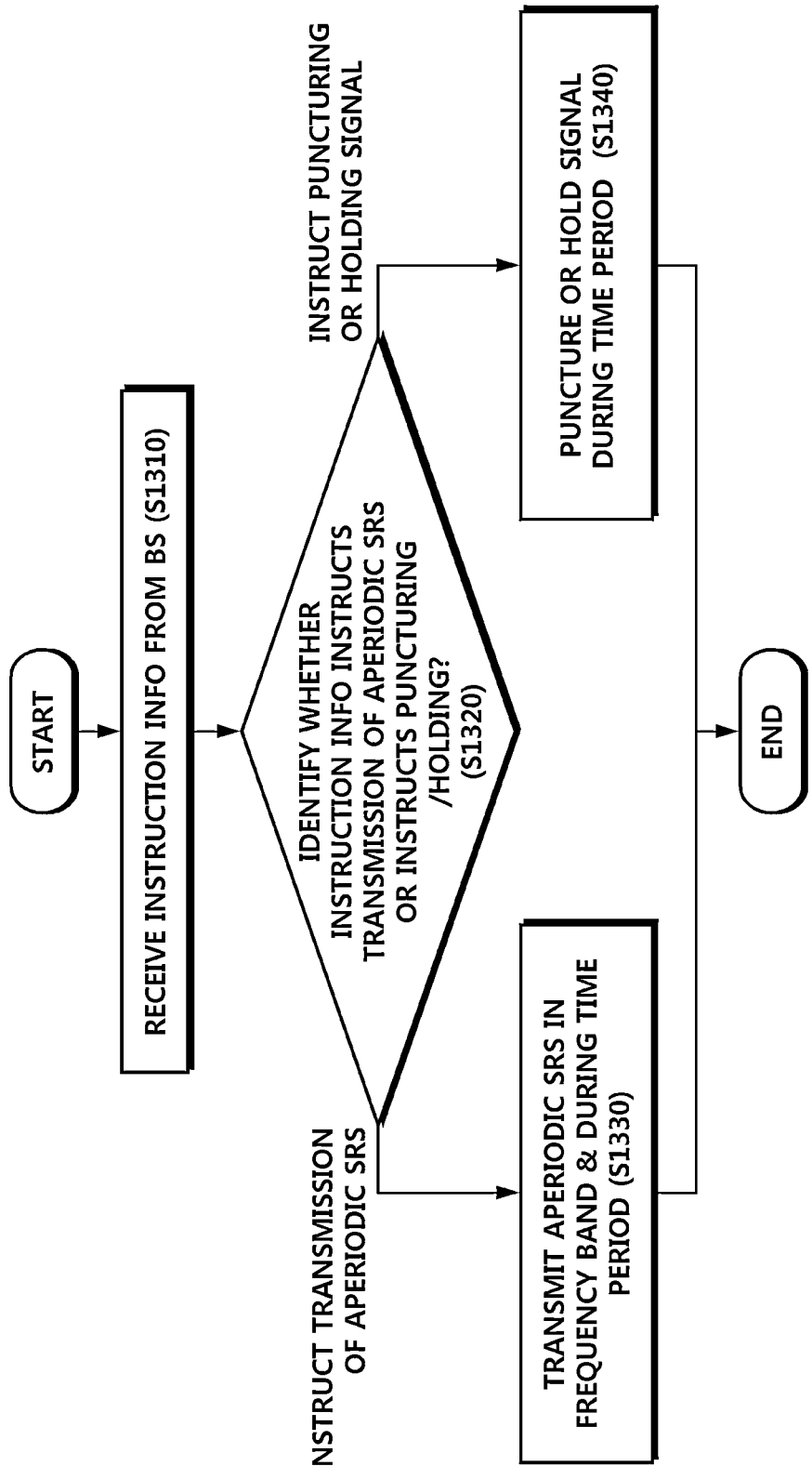
FIG. 13 is a flowchart showing the reception of instruction information for instructing an aperiodic transmission of a control signal and collision avoidance according to an embodiment of the present invention.

FIG. 13 is a flowchart showing a process for receiving instruction information for instructing an aperiodic transmission of a control signal and collision avoidance according to an embodiment of the present invention.

FIG. 13 illustrates a process for transmitting a signal, or holding or puncturing a signal when one UE becomes the first UE or the second UE or the third UE as shown in FIG. 12. When the UE is a UE which transmits an aperiodic SRS, it receives, from the base station, instruction information which instructs the transmission of an aperiodic SRS in a predetermined frequency band and during a predetermined time period. On the other hand, the UE allocated a region for transmitting a DM-RS/a PUSCH region/a region for transmitting a periodic SRS, which overlap a region where another UE transmits an aperiodic SRS, receives instruction information which instructs holding or puncturing the transmission of a signal.

More specifically, in a process where the UE transmits an aperiodic SRS, the UE receives the instruction information from the base station (S1310). When the UE identifies whether the instruction information instructs transmitting an aperiodic sounding reference signal in a predetermined frequency band and during a predetermined time period (S1320), the UE transmits an aperiodic SRS in the defined frequency band and during the defined time period (S1330). Information which instructs the transmission of an aperiodic sounding reference signal may be transmitted in various schemes. For example, the instruction information may be transmitted by using a DCI format. Otherwise, the instruction information may be transmitted in the form of information, which includes or indicates information on a frequency band and a time period allocated to another UE, through a data region of another channel. As described above, it goes without saying that an aperiodic sounding reference signal may be instructed to be transmitted in a DCI format 0 by using a code point.

Meanwhile, when the identification in step S1320 shows that the instruction information does not instruct transmitting an aperiodic sounding reference signal in the predetermined frequency band and during the predetermined time period, the UE identifies whether the instruction information instructs puncturing or holding the transmission of a signal during a predetermined time period in a previously-allocated frequency band. As an embodiment, when the instruction information instructs puncturing or holding the transmission of a signal in a previously-allocated PUSCH region or in a previously-allocated region for transmitting a periodic sounding reference signal, the UE punctures or holds the transmission of an SRS during a predetermined time period according to the puncturing or holding instruction information (S1340). Namely, according to the type of instruction information received by the UE, the UE may aperiodically transmit an SRS, or may puncture or hold a signal.

More specifically, when the UE needs to aperiodically transmit an SRS in the entire frequency band, the UE proceeds to steps S1320 and S1330.

Meanwhile, the UE aperiodically transmits an SRS in the entire frequency band. Accordingly, another UE using a part of the entire frequency band may puncture or hold a signal during a predetermined time period as instructed by the instruction information in order to avoid a collision of signals.

At this time, a signal punctured or held in step S1340 may become a data signal in the PUSCH as shown in FIG. 7, or may become a signal, such as a periodic SRS as shown in FIG. 8.

Figure 14:
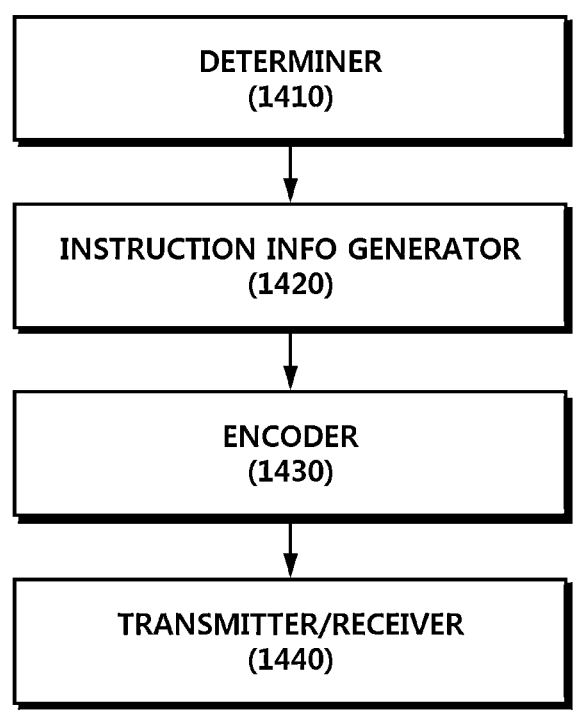
FIG. 14 is a block diagram showing the configuration of an apparatus for instructing an aperiodic transmission of a control signal or instructing the avoidance of a collision with an aperiodic transmission according to an embodiment of the present invention.

FIG. 14 is a block diagram showing the configuration of an apparatus for instructing an aperiodic transmission of a control signal or instructing the avoidance of a collision with an aperiodic transmission according to an embodiment of the present invention.

Referring to FIG. 14, an apparatus includes a determiner 1410, an instruction information generator 1420, an encoder 1430, and a transmitter/receiver 1440.

The determiner 1410 determines that the first UE is to transmit an aperiodic SRS in a frequency band and during a time period, which are allocated to the second UE. More specifically, the determiner 1410 determines a region where the first UE transmits an aperiodic sounding signal, and determines a region where the second UE transmits a demodulation reference signal, or a PUSCH region, or a region for transmitting a periodic sounding reference signal, which overlaps the transmission region.

The instruction information generator 1420 generates instruction information for instructing that the first UE may transmit the SRS signal in the determined frequency band and during the determined time period and instruction information which instructs the second UE to puncture or hold the transmission of a signal during the determined time period. Instruction information to be transmitted to the first UE and instruction information to be transmitted to the second UE may be differently generated, and may be generated in different processes. Namely, the generation of the two pieces of instruction information does not need to be simultaneously performed, and may performed in an identical process or in different processes.

In other words, the instruction information generator 1420 determines a region where the third UE transmits a demodulation reference signal, which overlaps the transmission region. Also, the instruction information generator 1420 generates both first instruction information which instructs the first UE to transmit a sounding reference signal in the transmission region, and second instruction information which instructs the second UE to puncture or hold a signal when the second UE transmits the signal in the PUSCH region or in the region for transmitting a periodic sounding reference signal.

The encoder 1430 generates a wireless signal including the first instruction information and the second instruction information. It goes without saying that the encoder 1430 generates the first instruction information and the second instruction information as wireless signals, respectively.

The transmitter/receiver 1440 transmits the generated first instruction information and the generated second instruction information to the first and second UEs, respectively, and receives an aperiodic sounding reference signal in the transmission region from the first UE.

Herein, in determining the time period, the determiner 1410 may determine the time period as a time point when the third UE transmits a demodulation reference signal. More specifically, referring to FIG. 7, the frequency band is determined to include a frequency band allocated to the second UE, and the time period may be determined to include a time point when the second UE transmits a signal including data. For example, as shown in FIG. 7, the frequency band may include the frequency band allocated to the second UE, and the time period may include the time point when the second UE transmits a signal including data, namely, a time point of transmitting data of a PUSCH. This configuration may be applied when the third UE corresponds to the UEs #1, #2 and #3 of FIG. 7 and the second UE corresponds to the UEs #4, #5 and #6 of FIG. 7.

It goes without saying that as shown in FIG. 8, the frequency band may include a frequency band allocated to the second UE and the time period may become a time point when the second UE transmits a periodic control signal, namely, an SRS. This configuration may be applied when the third UE corresponds to the UEs #1, #2 and #3 of FIG. 8 and the second UE corresponds to the UEs #4, #5 and #6 of FIG. 8.

Also, as shown in FIG. 10 or FIG. 11, use may be made of a time period during which the multiple UEs (UEs #1, #2, #3, #4 and #5) transmit DM-RSs. In this regard, as shown in FIG. 10, the UE #2 may transmit an aperiodic SRS in a frequency domain allocated to the multiple UEs (UEs #1, #3, #4 and #5) in one subframe. In this case, the multiple UEs (UEs #1, #3, #4 and #5) correspond to any one of the second UE and the third UE, but the multiple UEs all transmit DM-RSs. Accordingly, each of the multiple UEs does not need to separately hold or puncture a signal.

Namely, referring to FIG. 11, in a first subframe, the UE #2 may transmit an aperiodic SRS in a frequency band and at a time point that the UEs #3, #4 and #5 are allocated so as to transmit DM-RSs. In a second subframe, the UE #2 may transmit an aperiodic SRS in a frequency band and at a time point that the UE #1 is allocated so as to transmit a DM-RS.

Figure 15:
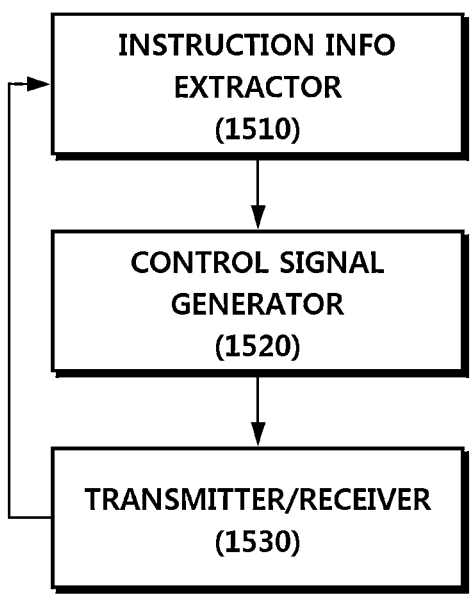
FIG. 15 is a block diagram showing the configuration of an apparatus for receiving instruction information for instructing an aperiodic transmission of a control signal and collision avoidance according to an embodiment of the present invention.

FIG. 15 is a block diagram showing the configuration of an apparatus for receiving instruction information for instructing an aperiodic transmission of a control signal and collision avoidance according to an embodiment of the present invention.

Referring to FIG. 15, an apparatus includes an instruction information extractor 1510, an SRS signal generator 1520, and a transmitter/receiver 1530.

The transmitter/receiver 1530 receives a wireless signal from the base station. The instruction information extractor 1510 first extracts instruction information from a wireless signal received from the transmitter/receiver 1530, and then identifies whether the instruction information is first instruction information which instructs transmitting an aperiodic sounding reference signal in a predetermined frequency band and during a predetermined time period, or whether the instruction information is second instruction information which instructs puncturing or holding a signal in a PUSCH region or in a region for transmitting a periodic sounding reference signal.

According to the type of the received instruction information, the transmitter/receiver 1530 may aperiodically transmit an SRS. Otherwise, when the received instruction information instructs puncturing or holding the transmission of a signal during a predetermined time period in a previously-allocated frequency band, for example, when the received instruction information instructs puncturing or holding a signal in a PUSCH region or in a region for transmitting a periodic sounding reference signal, the transmitter/receiver 1530 may puncture or hold the relevant signal during the time period.

When it is required to aperiodically transmit an SRS, the SRS signal generator 1520 generates an SRS signal which is to be aperiodically transmitted in the frequency band and during the time period.

Meanwhile, the UE aperiodically transmits an SRS in the entire frequency band. Accordingly, another UE using a part of the entire frequency band may puncture or hold a signal during a predetermined time period as instructed by the instruction information in order to avoid a collision of signals. In an embodiment of the transmission of another signal, another signal may be a demodulation reference signal, or a signal including data in a PUSCH, or a periodic SRS.

In this specification, by transmitting an aperiodic SRS, a channel state of a UE can be efficiently transmitted to a base station.

Although the above description is only an illustrative description of the technical idea of the present invention, those having ordinary knowledge in the technical field of the present invention will appreciate that various modifications, additions and substitutions are possible, without departing from the scope and spirit of the invention as disclosed in the appended claims. Therefore, the embodiments disclosed in the present invention are intended to illustrate the scope of the technical idea of the present invention, and the scope of the technical idea of the present invention is not limited by the embodiments. The protection scope of the present invention should be construed based on the accompanying claims, and all of the technical ideas included within the scope equivalent to the claims should be construed as being included within the right scope of the present invention.

The invention claimed is:

1. A method for aperiodically receiving a sounding reference signal, the method comprising:
   determining, by a base station, a first transmission region in which a first user equipment transmits an aperiodic sounding signal, a second transmission region which overlaps the first transmission region, and in which a second user equipment transmits a demodulation reference signal, or transmits data, or transmits a periodic sounding reference signal, and a third transmission region which overlaps the first transmission region, and in which a third user equipment transmits a demodulation reference signal;
   generating, by the base station, first instruction information which instructs the first user equipment to transmit an aperiodic sounding reference signal in the first transmission region;
   generating, by the base station, second instruction information which instructs the second user equipment to puncture or hold a signal when the second user equipment transmits the signal including data or the periodic sounding reference signal in the second transmission region;
   transmitting, by the base station, the first instruction information to the first user equipment, and transmitting, by the base station, the second instruction information to the second user equipment; and
   receiving, by the base station, the aperiodic sounding reference signal from the first user equipment in the first transmission region.

2. The method as claimed in claim 1, wherein the first instruction information and the second instruction information are transmitted through a physical channel, the first instruction information is transmitted by using a remaining code point excluding code points used for resource allocation within a resource allocation (RA) field defined for resource allocation in a downlink control information (DCI) format 0, and the second instruction information is transmitted by using a power control bit of a DCI format 3/3A.

3. The method as claimed in claim 2, wherein the method further comprises that the second instruction information is transmitted by using a remaining code point excluding the code points used for the resource allocation within the RA field of the DCI format 0, or is transmitted by using at least one of an indicator field discriminating a format of the DCI format 0 from another format, a field indicating an aperiodic channel quality indicator (CQI), a field indicating whether frequency hopping is performed, and a filler bit field added in order to cause a size of the DCI format 0 to coincide with a size of another DCI format.

4. The method as claimed in claim 2, wherein the second instruction information simultaneously instructs the second user equipment and the third user equipment to perform puncturing or holding by using a power control bit of the DCI format 3/3A.

5. A method for aperiodically transmitting a sounding reference signal, the method comprising:
receiving, by a user equipment, instruction information from a base station; and
transmitting, by the user equipment, an aperiodic sounding reference signal in a predetermined frequency band and during a predetermined time period when the instruction information is first instruction information which instructs transmitting the aperiodic sounding reference signal in the predetermined frequency band and during the predetermined time period, and puncturing or holding, by the user equipment, a signal when the instruction information is second instruction information which instructs puncturing or holding the signal including data or the periodic sounding reference signal.

6. The method as claimed in claim 5, wherein the first instruction information and the second instruction information are received through a physical channel, the first instruction information is received by using a remaining code point excluding code points used for resource allocation within a resource allocation (RA) field defined for resource allocation in a downlink control information (DCI) format 0, and the second instruction information is received by using a power control bit of a DCI format 3/3A.

7. The method as claimed in claim 6, wherein the method further comprises that the second instruction information is received by using a remaining code point excluding the code points used for the resource allocation within the RA field of the DCI format 0, or is received by using at least one of an indicator field discriminating a format of the DCI format 0 from another format, a field indicating an aperiodic channel quality indicator (CQI), a field indicating whether frequency hopping is performed, and a filler bit field added in order to cause a size of the DCI format 0 to coincide with a size of another DCI format.

8. The method as claimed in claim 6, wherein the second instruction information simultaneously instructs puncturing or holding by using a power control bit of the DCI format 3/3A.

9. An apparatus for aperiodically receiving a sounding reference signal, the apparatus comprising:
a determiner of a base station for determining a first transmission region in which a first user equipment transmits an aperiodic sounding signal, a second transmission region which overlaps the first transmission region, and in which a second user equipment transmits a demodulation reference signal, or transmits data, or transmits a periodic sounding reference signal, and a third transmission region which overlaps the first transmission region, and in which a third user equipment transmits a demodulation reference signal;
an instruction information generator of the base station for generating first instruction information which instructs the first user equipment to transmit an aperiodic sounding reference signal in the first transmission region, and generating second instruction information which instructs the second user equipment to puncture or hold a signal when the second user equipment transmits the signal including data or the periodic sounding reference signal in the second transmission region; and
a transmitter/receiver of the base station for transmitting the first instruction information to the first user equipment, transmitting the second instruction information to the second user equipment, and receiving the aperiodic sounding reference signal from the first user equipment in the first transmission region.

10. The apparatus as claimed in claim 9, wherein the first instruction information and the second instruction information are transmitted through a physical channel, the first instruction information is transmitted by using a remaining code point excluding code points used for resource allocation within a resource allocation (RA) field defined for resource allocation in a downlink control information (DCI) format 0, and the second instruction information is transmitted by using a power control bit of a DCI format 3/3A.

11. The apparatus as claimed in claim 10, wherein the apparatus further comprises that the second instruction information is transmitted by using a remaining code point excluding the code points used for the resource allocation within the RA field of the DCI format 0, or is transmitted by using at least one of an indicator field discriminating a format of the DCI format 0 from another format, a field indicating an aperiodic channel quality indicator (CQI), a field indicating whether frequency hopping is performed, and a filler bit field added in order to cause a size of the DCI format 0 to coincide with a size of another DCI format.

12. The apparatus as claimed in claim 10, wherein the second instruction information simultaneously instructs the second user equipment and the third user equipment to perform puncturing or holding by using a power control bit of the DCI format 3/3A.

13. An apparatus for aperiodically transmitting a sounding reference signal, the apparatus comprising:
a transmitter/receiver of a user equipment for receiving a wireless signal from a base station;
an instruction information extractor of the user equipment for extracting, from the received wireless signal, first instruction information which instructs transmitting an aperiodic sounding reference signal in a predetermined frequency band and during a predetermined time period, or second instruction information which instructs puncturing or holding a signal including data or a periodic sounding reference signal; and
an aperiodic sounding signal generator of the user equipment for generating the aperiodic sounding reference signal to be transmitted in the frequency band and during the time period when instruction information extracted by the instruction information extractor is the first instruction information,
wherein the transmitter/receiver transmits the generated aperiodic sounding reference signal when the instruction information is the first instruction information, and the transmitter/receiver punctures or holds the signal including the data or the periodic sounding reference signal when the instruction information is the second instruction information.

14. The apparatus as claimed in claim 13, wherein the first instruction information and the second instruction information are received through a physical channel, the first instruction information is received by using a remaining code point excluding code points used for resource allocation within a resource allocation (RA) field defined for resource allocation in a downlink control information (DCI) format 0, and the second instruction information is received by using a power control bit of a DCI format 3/3A.

15. The apparatus as claimed in claim 14, wherein the apparatus further comprises that the second instruction information is received by using a remaining code point excluding the code points used for the resource allocation within the RA field of the DCI format 0, or is received by using at least one of an indicator field discriminating a format of the DCI format 0 from another format, a field indicating an aperiodic channel quality indicator (CQI), a field indicating whether frequency hopping is performed, and a filler bit field added in order to cause a size of the DCI format 0 to coincide with a size of another DCI format.

16. The apparatus as claimed in claim 14, wherein the second instruction information simultaneously instructs puncturing or holding by using a power control bit of the DCI format 3/3A.

* * * * *